Feb. 21, 1967 K. P. YADAV ETAL 3,305,844

APPARATUS FOR STORAGE IN A MOVABLE MEDIUM

Filed March 16, 1964 2 Sheets-Sheet 1

INVENTORS.
KAMLA P. YADAV and
ALLEN C. HIRTLE

BY [signature]

ATTORNEY.

INVENTORS.
KAMLA P. YADAV and
ALLEN C. HIRTLE
BY Fred Jacob
ATTORNEY.

United States Patent Office 3,305,844

Patented Feb. 21, 1967

3,305,844

APPARATUS FOR STORAGE IN A MOVABLE MEDIUM

Kamla P. Yadav, Waltham, and Allen C. Hirtle, Braintree, Mass., assignors to Honeywell Inc., a corporation of Delaware Filed Mar. 16, 1964, Ser. No. 352,023
11 Claims. (Cl. 340—172.5)

The present invention relates in general to new and improved apparatus for storing representations of input data in a movable storage medium, in particular to data processing apparatus wherein data representations are provided at a predetermined number of storage positions in a document in accordance with stored input data.

For purposes of illustrating and describing the present invention, the latter will be explained with reference to a document punch. It will be understood, however, that the invention is not so limited. In presently available equipment of this kind, where the end product may be a punched card having eighty columns and twelve rows, the card is moved stepwise past a punch station of eighty separate punches, some or all of which may be simultaneously actuated for a particular card row. This procedure is repeated for each of the twelve card rows.

The punches may be actuated electro-magnetically, with each punch solenoid being energized from a relay, a thyratron, a silicon-controlled rectifier or similar device. Since the principal desired characteristics of such a device are high-power gain with high-current buffered output for low-speed, on-off operation, coupled with low cost and reliable performance, thyratrons and, more recently, silicon-controlled rectifiers have come into general usage. Both of these devices are capable, having once received a signal on an input terminal, of sustaining current flow between a pair of output terminals as long as a predetermined potential exists across the latter terminal pair. The input data which governs how each card is to be punched, may be derived from a core memory whose storage locations are sequentially addressed for data readout. Since punching must occur simultaneously in each row, the sequentially read out contents of the aforesaid eighty storage locations (one for each column of the card), must be temporarily stored in as many flip-flops or equivalent storage devices, before they are simultaneously applied to the aforesaid eighty input terminals. Such a requirement materially increases the total expense of the apparatus, quite apart from the fact that the associated servicing and reliability problems are aggravated.

In an attempt to save the expense of having to provide the aforesaid temporary storage capacity separately, prior-art data processing systems have taken advantage of existing storage capacity in other parts of the system. In one such case, the arithmetic unit in the associated central processor of the system has a sufficiently large number of flip-flop circuits available, eighty of which are employed to provide the aforesaid temporary storage. Such a scheme, however, has the effect of tying up the affected equipment, in this case the central processor, for the time period required to sequentially read out eighty storage locations for each of twelve card rows. Since the operation of the central processor is faster by several orders of magnitude than that of the associated output equipment such as the punch, such a technique prevents the central processor from supplying other output equipment with data for the aforesaid period. As a consequence, the data-handling capacity of the data processing system is materially reduced.

It is the primary object of the present invention to provide apparatus which overcomes the foregoing disadvantages.

It is another object of the present invention to provide data processing apparatus for storing representations of input data storage at a predetermined number of positions of a movable storage medium, which is both simple in construction and inexpensive.

It is a further object of the present invention to provide apparatus for transferring representations of input data to a predetermined number of storage positions of a movable storage medium, wherein the inherent storage capacity of the transfer equipment is employed for the temporary storage of the sequentially arriving input data.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

Figure 1:
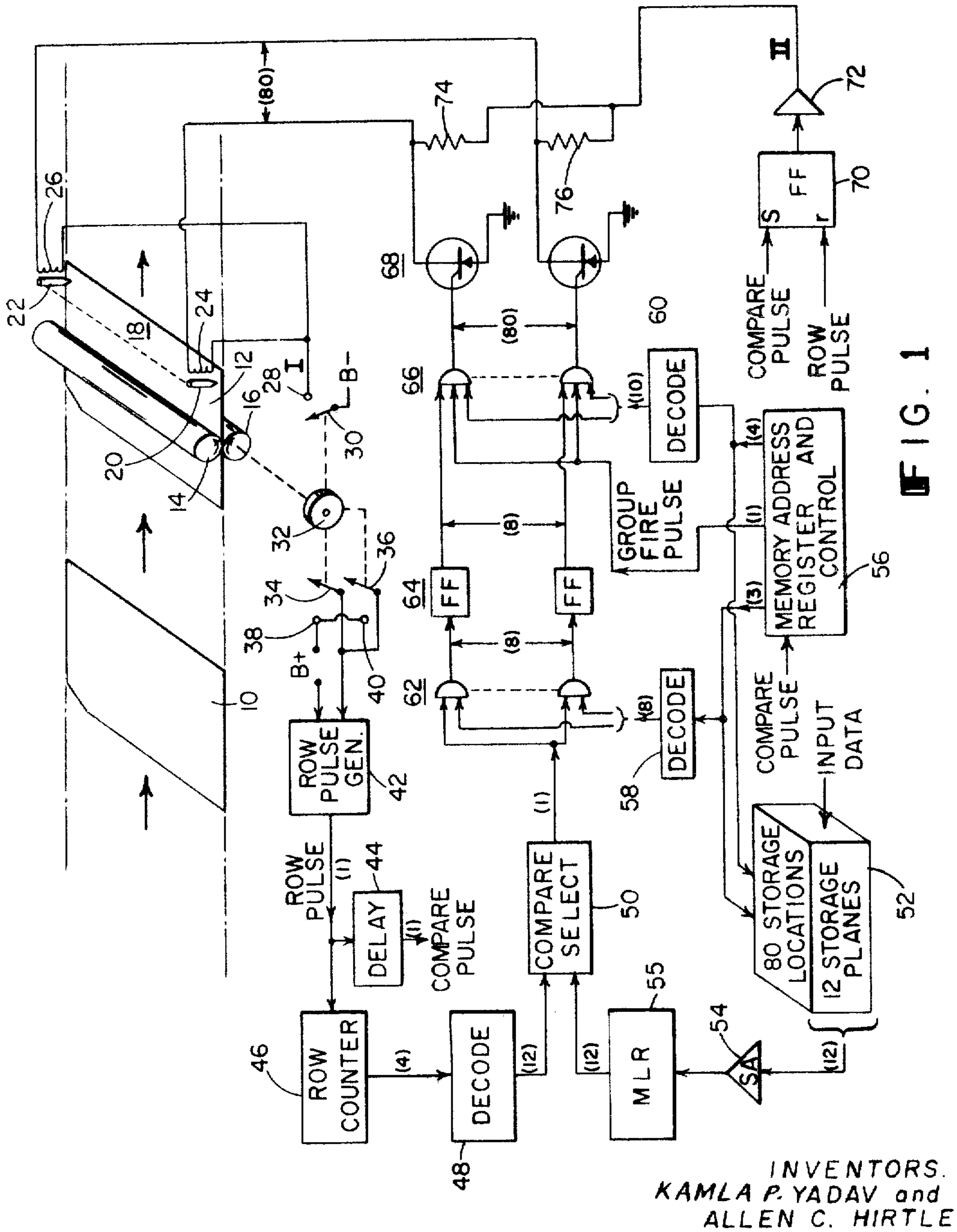
FIGURE 1 illustrates a preferred embodiment of the present invention.

With reference now to FIGURE 1, the cards 10 and 12 are moved in the direction of the arrows by a document transport which is illustrated only in part for the sake of clarity. As previously explained, each card has eighty columns and twelve rows in which punching may occur. A pair of pinch rollers 14 and 16 move the card 12 stepwise under the punch station 18 which consists of eighty punches. Only the punches 20 and 22 are shown for the sake of clarity. Each punch has an electromagnetic actuator, including a solenoid winding such as the windings 24 and 26 respectively. Corresponding output terminals of the aforesaid solenoid windings 24 and 26 are seen to be connected to a common contact terminal 28 of a switch 30. A D.C. source B— is connected to the switch arm so that, when the latter makes contact with the terminal 28, a current, which is designated as signal I, is applied to the aforesaid solenoid windings.

A cam 32 is mechanically coupled to the pinch roller 16, as indicated by the appropriate broken-line connection. The cam is arranged to actuate the aforesaid switch 30 once for each card row, i.e. twelve times per card. The cam 32 is further arranged to actuate a switch 34 once for each card row and a switch 36 once per card. The switches 34 and 36 are adapted to make contact with a pair of connected contact terminals 38 and 40 respectively, which are themselves connected in series with a D.C. source B+. The last-mentioned D.C. source is further connected to one input of a row pulse generator 42, the other input of which is connected to the switch arms of the aforesaid switches 34 and 36 respectively.

A row pulse signal is derived on a single output line of the row pulse generator 42, as evidenced by the associated numeral 1 in the drawing. The row pulse signal is applied to a delay 44, at the output of which corresponding compare pulses are derived. The row pulse signal is further coupled to a 4-bit row counter 46, whose output signal appears on four output lines, as evidenced by the associated numeral 4. The latter output is applied to a decoder 48 which provides a responsive signal on twelve output lines that are coupled to the input of a compare select circuit 50.

A core memory matrix 52 receives input data from an external source, as indicated in the drawing. In the instant example, the external source may constitute the arithmetic unit of the associated central processor. The matrix is seen to consist of twelve storage planes, each corresponding to one row of the card 12. Each plane contains eighty storage locations, corresponding to the respective punches of the punch station 18. The output of the matrix is derived on twelve sense lines which are coupled to an equivalent number of sense amplifiers 54.

The sense amplifier output is further applied to a memory local register 55 which provides the required temporary storage for the readout of the memory 52. The 12-bit output of the register 55 is coupled to the input of the aforesaid compare select circuit 50.

A memory address register and control circuit 56 is seen to receive the aforesaid compare pulse as an input. The unit 56 includes a 7-bit register which, in the illustrated embodiment, is divided into 3-bit and 4-bit register portions respectively. A 3-bit output, as indicated by the associated numeral 3, is derived from the unit 56 and is applied to the memory 52 as well as to a decoder 58 which provides a responsive 8-bit output. A 4-bit output, as indicated by the associated numeral 4, is also derived from the unit 56 and is applied to the memory 52. The aforesaid 4-bit output is further coupled to a decoder 60 which provides a responsive 10-bit output. In addition, a single-bit output entitled Group Fire Pulse is derived from the unit 56 whenever the aforesaid 3-bit register is full.

The 8-bit output of the decoder 58 is coupled to one input of each of a corresponding set of eight gates 62. The other input of each of the aforesaid gates is coupled to the output of the compare select circuit 50. The 8-line output of the gates 62 is coupled to a set of eight corresponding flip-flops 64, the output of the latter being further coupled to one input of each of a set of eighty gates 66. The aforesaid Group Fire Pulse is applied to a second input of each of the gates 66, while a third input of the latter gates is connected to the aforesaid decoder 60.

The eighty outputs of the gates 66 are connected to the inputs of a corresponding set of eighty silicon controlled rectifiers. Each of the latter inputs is, by convention, referred to as the gate of the rectifier. The anode of each of the SCR's is grounded while the cathode is connected to the other terminal of a corresponding one of the aforesaid eighty punch solenoids, such as the solenoids 24 and 26 respectively. Thus, a first circuit is formed in each case, which includes the rounded anode of the SCR, the cathode, the solenoid winding, switch 30 and the B− source. As pointed out above, each silicon-controlled rectifier is of the type wherein, when a sustaining voltage appears between the anode and the cathode, current flow between these terminals is initiated upon the application of an input signal to the gate, such current flow being sustained as long as the aforesaid voltage is maintained.

A flip-flop circuit 70 receives the aforesaid compare pulses at its set input and the aforesaid row pulses at its reset input. The output of the flip-flop 70 is coupled to a driver 72, whose output signal is designated signal II. The latter signal is coupled to the common terminal of a plurality of sustaining resistors, such as the resistors 74 and 76, each corresponding to one of the aforesaid SCR's 68. The free terminal of each resistor is connected to the cathode of the corresponding SCR. Thus, a second circuit is formed in each case, which includes the anode and cathode of the SCR, the sustaining resistor and the voltage source represented by the signal II at the output of the driver 72. Each of the aforesaid resistors 74 to 76 has an impedance that is relatively large compared to the impedance of the corresponding solenoids 24 to 26, but a value adapted to couple a sustaining voltage to the cathode of the corresponding SCR, upon energization from the driver 72.

The operation of the apparatus of FIGURE 1 will be explained with the aid of the waveforms of FIGURE 2. The cards which are to be punched move stepwise past the punch station 18 by virtue of the action of the pinch rollers 14 and 16. The input data which is to be punched into a single card, is stored in the twelve planes of the memory 52. At time $t_{1A}$, when the card 12 first moves under the punch station 18, the cam 32, which is mechanically coupled to the roller 16, causes the switch

36 to close momentarily so that a B+ voltage is applied to the row pulse generator 42. The latter generates a responsive row pulse at time $t_{1A}$, as indicated in FIGURE 2. The row pulse is applied to the delay 44, which provides a corresponding compare pulse at time $t_{1B}$ when the first of the twelve card rows has reached the station 18 and is awaiting punching. In addition, the row pulse is applied to the row counter 46 whose responsive output signal is decoded by the decoder 48, whence it is applied to an input terminal of the compare select circuit 50.

The appearance of the compare pulse at time $t_{1B}$ sets the flip-flop 70 whose responsive output signal is applied to the driver 72. The output signal II, which is illustrated in FIGURE 2, is derived from the driver 72 and applies a sustaining votlage to each of the eighty resistors 74 to 76. This voltage is applied between the cathode and the anode of the corresponding SCR's to condition each of the latter for current flow upon the application of an input signal to its gate.

The operation of the memory address register and control unit 56 is initiated by the compare pulse at time $t_{1B}$. Under the control of externally derived clock pulses (not shown), the unit 55 sequentially addresses the storage locations of the memory 52 which contains the input data that is to be punched into the card 12. Corresponding storage locations in the twelve storage planes, as determined by row and column, are simultaneously addressed. Thus, for the first storage location addressed, twelve output signals are derived. These signals, upon being amplified by the sense amplifiers 54, are stored in the memory local register 55 for application to the compare select circuit 50. The latter circuit, in accordance with the decoded row signal received, selects a single output signal from the storage plane which corresponds to the row under the punch station 18. In the instant case, the first storage plane is selected, the contents of the first eight storage locations therein appearing sequentially at the output of the circuit 50 for application to the eight gates 62.

The gates 62 are additionally energized from the eight output lines of the decoder 58 which, in turn, is responsive to the 3-bit output signal derived from the memory address and control register 56. The latter output signal successively counts up to eight. In this manner, the contents of the first eight storage locations of the selected storage plane are sequentially read into the gates 62, the resultant gate output signals being temporarily stored in the eight flip-flops 64 whose outputs are coupled to a set of eighty gates 66.

The latter gates are additionally energized from the ten output lines of the decoder 60 which, in turn, is responsive to ten counts of the 4-bit output signal from the unit 56. The latter count is changed by one each time a Group Fire Pulse is generated, i.e. when the count of eight is reached by the 3-bit output signal of the unit 56. Thus, when the first Group Fire Pulse appears, the contents of the eight flip-flops 64 are applied to eight of the selected gates 66 and thence to the input terminals of the corresponding silicon-controlled rectifiers 68. Each one of the selected group of eight SCR's which receives an input signal then fires and remains in the conductive state because of the existence of a sustaining voltage between its anode and cathode due to the signal II.

Following the occurrence of the first Group Fire Pulse, the 3-bit output signal of the unit 56 again counts up to eight, while the 4-bit signal from the same circuit reaches its second count to condition a second group of eight gates of the gate set 66 for the acceptance of signals from the flip-flops 64. The latter now contains the contents of the second eight storage locations of the selected storage plane, received by way of the gates 62. As before, corresponding ones of a second group of eight connected SCR's will fire and remain conductive if an input signal is received. The aforesaid process continues until time $t_{1C}$ when all of the eighty storage locations of the first storage plane have been sequentially read out and have been consecutively applied to corersponding groups of eight SCR's to fire the latter.

Figure 2:
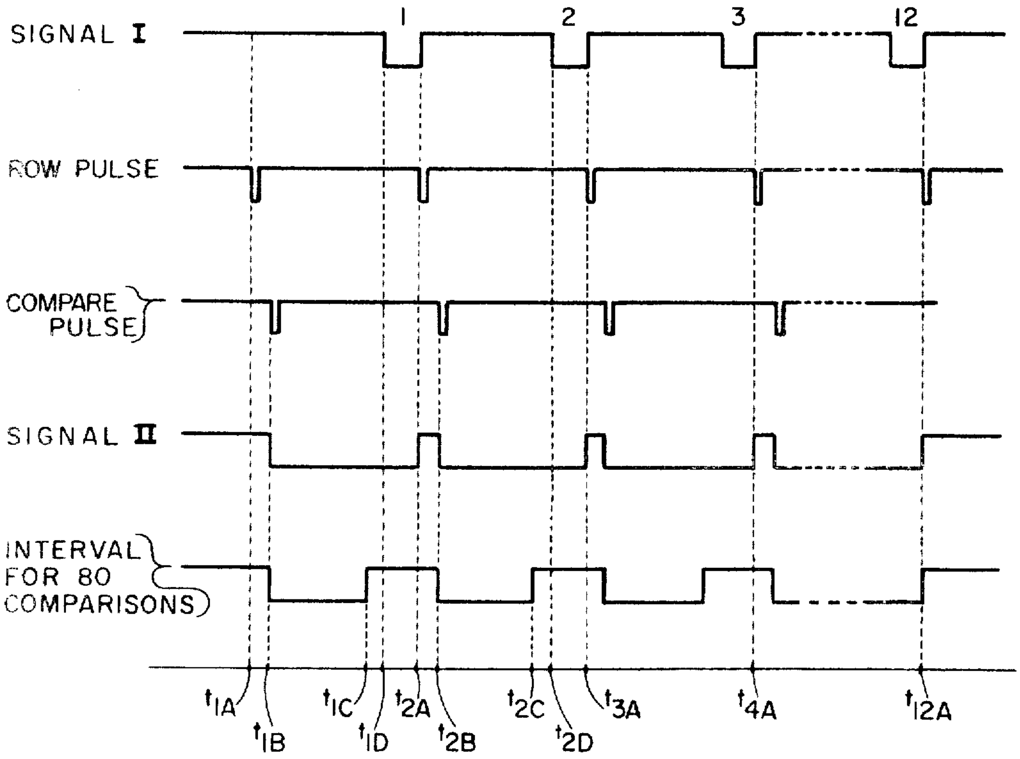
FIGURE 2 is a timing diagram which is applicable to the operation of the apparatus of FIGURE 1.

At time $t_{1D}$, when each one of the eighty SCR's which received an input signal during the interval $t_{1B}-t_{1D}$ is in its conductive state, the cam 32 closes the switch 30 to apply the signal I, shown in FIGURE 2, to each of the eighty solenoid windings. In effect, the solenoid and the B— source of each of the aforesaid first circuits now shunt the sustaining resistor and driver output of the corresponding second circuits. Since the impedance of each solenoid winding is less than that of the corresponding sustaining resistor, the current from the energized SCR's is shunted through the connected solenoid windings and the corresponding punches are simultaneously actuated. The action of the switch 30, which is controlled from the cam 32, determines the duration of the signal I pulse. The latter is seen to terminate at time $t_{2A}$ to render the silicon-controlled rectifiers 68 non-conductive.

The first one of the twelve time intervals for punching the card 12 is now complete and the pinch rollers 14 and 16 advance the card to the next row for punching. The switch 34 is temporarily closed by the cam 32 at time $t_{2A}$ to generate the next row pulse. The later pulse resets the flip-flop 70 to terminate the signal II and initiates the next time interval.

The process then repeats essentially as outlined above, subsequent row pulses being produced by the closing of the switch 34 in each case. For each new card row, the contents of a different storage plane are read out. After punching has taken place twelve times, the card 12 passes out from under the punch station and the card 10 arrives.

It will be seen from the foregoing explanation that the present invention provides an economical and reliable circuit for transferring data representations to a document in accordance with stored input data. In particular, the storage capability of the silicon-controlled rectifiers 68, which are merely used for switching purposes in prior-art equipment of this type, is now utilized in lieu of additional temporary storage means.

The illustrated embodiment of the invention is intended to be exemplary only. It is readily apparent that the invention is similarly applicable to a printer of the type wherein a plurality of data characters are simultaneously printed on each print line. While heretofore a separate temporary storage device was required for each character, it is possible, by means of the present invention, to use silicon-controlled rectifiers for the dual purpose of energizing the electromagnetic actuators and to provide temporary storage.

It will be understood that the eight flip-flops 64, which are conveniently employed in one embodiment of the invention, are not themselves required. The sequentially read out data contents from the memory 52 may be coupled directly to the corresponding SCR's. The card transport illustrated in FIGURE 1 may, of course, take different forms, provided only that pulses are derived corresponding to the arrival of each document at the punch station and the positioning of each card row thereunder at regular time intervals thereafter. Similarly, the particular arrangement illustrated by the switches 34, 36 and 30 may be replaced by circuitry providing the equivalent electrical signals at the times indicated. Alternatively, signal II may be switch-derived in similar manner as signal I.

The silicon-controlled rectifiers 68 may be replaced by thyratrons or like devices wherein the application of a sustaining voltage between a pair of output terminals will maintain current flow once the latter has been initiated by the application of an input signal to the input terminal. Such units as the row counter 46, the row pulse genenerator 42 and the memory local register 55, may each take the form of a number of circuits well known at this stage of the art. Similarly, the compare select circuit 50 may constitute simple gating circuitry which may take the form of a number of different, well-known circuits.

The illustrated decoders are not intended to be limiting on the circuit arrangement, but merely demonstrate a convenient way of implementing the present invention. It will be understood that the invention may be carried out by the use of different decoding schemes, depending on the requirements of each particular situation. The decoders themselves may take the form of various circuits, each well known in the art. Similarly, the unit 56 need not take the form shown in the drawing, but may, for example, include a continuous 7-bit register. It will be understood that in the latter case a different decoding scheme than that shown must be adopted.

Single sustaining resistors have been illustrated in association with each SCR. As previously explained, the purpose of the sustaining resistors is to maintain a voltage across the cathode and anode of the associated SCR sufficient to sustain current flow therein. It will be readily apparent that each resistor may take a form different from the indicated, provided only that the proper sustaining voltage is coupled across the output electrodes of the associated SCR and that its impedance is large compared to that of the corresponding solenoid winding. Depending on the particular operating conditions, it may also be desirable to connect blocking diodes in each of the eighty lines coupling the sustaining resistors to the corresponding solenoid windings. Such diodes would be poled to block sneak currents from flowing through the sustaining resistors when, for example, the first SCR has fired and draws a sustaining current while the remaining SCR's are in the cut-off state.

From the foregoing explanation, it will be apparent that numerous modifications, changes and equivalents will now occur to those skilled in the art, all of which fall within the true spirit and scope contemplated by the present invention.

What is claimed is:

1. Data processing apparatus comprising a transport for moving a document stepwise past a transfer station adapted to provide data representations at successive storage positions of said document, said transfer station including a plurality of solenoid-actuated transfer means each adapted to produce a data representation in a discrete area of a storage position, an input data memory including a like plurality of storage locations, a self-sustaining electronic switch corresponding to each of said plurality of transfer means having an input terminal and a pair of output terminals, each of said output terminal pairs being connected in a first series circuit to the solenoid of the corresponding transfer means, each of said output terminal pairs being further connected in a second series circuit to a resistor having a high impedance relative to said solenoid and adapted, when energized, to sustain current flow between said output terminal pair, transport-controlled means responsive to the presence of a document storage position at said transfer station for simultaneously energizing each of said second circuits for a predetermined time interval, means for sequentially addressing said plurality of storage locations to read out their data contents during a first portion of said time interval, means responsive to said sequential addressing means for coupling each of said data contents to the input terminal of the corresponding switch to initiate current flow between the output terminals thereof, and means responsive to said transport-controlled means for simultaneously energizing each of said first circuits during a subsequent portion of said time interval to effect the transfer of representations of the input data contents in said storage locations to said storage position of said document.

2. Data processing apparatus comprising a transport for moving a document stepwise past a transfer station adapted to provide data representations at a predetermined number of successive storage positions of said document, said transfer station including a plurality of solenoid-actuated transfer means each adapted to produce a data representation in a discrete area of a storage position, an input data member including a storage unit corresponding to each storage position of a document, each of said storage units comprising a like plurality of corresponding storage locations, a self-sustaining electronic switch corresponding to each of said plurality of transfer means and including an input terminal and a pair of output terminals, each of said output terminal pairs being connected in a first series circuit to the solenoid of the corresponding transfer means, each of said output terminal pairs being further connected in a second series circuit to a resistor having a high impedance relative to said solenoid and adapted, when energized, to sustain current flow between said output terminal pair, transport-controlled means responsive to the presence of a storage position of said document at said transfer station for simultaneously energizing each of said second circuits for a predetermined time interval, means for sequentially addressing said plurality of storage locations simultaneously in all of said storage units to read out their data contents during a first portion of said time interval, means responsive to said transport-controlled means for selecting the data contents of the storage unit which corresponds to the storage position at said transfer station, means responsive to said sequential addressing means for coupling each of said selected data contents to the input terminal of the corresponding switch to initiate current flow between the output terminals thereof, and means responsive to said transport-controlled means for simultaneously energizing each of said first circuits during a subsequent portion of said time interval to effect the transfer of representations of the input data contents of said storage locations to said storage position of said document.

3. A data processing system comprising means for storing data in a plurality of storage locations, a like plurality of electro-mechanical transfer means for storing representations of said data in a storage medium, electronic switch means corresponding to each of said transfer means each including a first element adapted to be coupled to a corresponding one of said storage locations, said first element when energized, being adapted to initiate current flow between second and third elements of said switch means, said current flow being sustained in dependence on the voltage between the latter pair of elements, said second element being coupled to a reference potential, resistive means corresponding to each of said switch means, said transfer means and said resistive means each having one terminal coupled to said third element, means cyclically operative for simultaneously applying a potential sufficient to sustain current flow to the other terminal of each of said resistive means during a predetermined time interval, means operative within said time interval for sequentially reading out said plurality of storage locations to said switch means to fire the latter, and means operative within said time interval following said sequential readout for simultaneously applying said potential to the other terminal of each of said transfer means.

4. Apparatus for storing representations of data in a data storage medium derived from a plurality of data storage locations, comprising a like plurality of self-sustaining electronic switches corresponding respectively to said storage locations, means corresponding to each of said switches for transferring said data representations to discrete areas of said storage medium, impedance means corresponding to each of said switches, means operative throughout a predetermined time interval for simultaneously coupling a voltage in series circuit with each of said impedance means and its corresponding electronic switch adapted to sustain current flow in the latter, means for reading data out of said plurality of storage locations in sequence during a first portion of said time interval to fire the corresponding electronic switches, and means for simultaneously coupling said voltage in series circuit with each of said electronic switches and the corresponding transfer means during a second portion of said time interval.

5. Apparatus for storing at successive positions of a movable data storage medium representations of data derived from a plurality of data storage locations, comprising a like plurality of self-sustaining electronic switches adapted to receive data from said storage locations, a corresponding plurality of transfer means, each coupled to one of said switches in a first circuit, for storing said data representations at discrete areas in each position of said storage medium, a like plurality of impedance means each coupled to one of said switches in a second circuit and adapted, when energized, to sustain current flow therein, means operative at each position of said storage medium for simultaneously energizing each of said second circuits for a predetermined time interval, means for reading data out of said plurality of storage locations in sequence during a first portion of said time interval to initiate the operation of the corresponding switches, and means for simultaneously energizing each of said first circuits during a subsequent portion of said time interval.

6. A switching circuit comprising a plurality of silicon-controlled rectifiers each adapted to drive a load corresponding thereto, each of said rectifiers having a separate sustaining resistor connected in a series combination therewith, means including a first switch for simultaneously applying a voltage across each of said series combinations during a predetermined time interval adapted to sustain current flow in each rectifier, means for applying input signals to selected ones of said rectifiers to render them conductive during a first portion of said time interval, and means including a second switch for simultaneously coupling each of said loads across its corresponding rectifier in series with said sustaining voltage during a second portion of said time interval to shunt said current flow through said loads.

7. A switching circuit comprising a plurality of silicon-controlled rectifiers each adapted to drive a load corresponding thereto, each of said rectifiers including an input terminal and a pair of output terminals, separate sustaining resistance means connected in series combination with each of said output terminal pairs, means including a first switch for simultaneously applying a voltage across each of said series combinations throughout periodically recurring time intervals, adapted to sustain current flow in each rectifier, means operative during a first portion of each of said time intervals for sequentially applying output signals to selected ones of said input terminals to render the connected rectifiers conductive, and means operative during a second portion of each time interval for simultaneously coupling each of said leads across the output terminal pair of its corresponding rectifier in series with said sustaining voltage to shunt said current flow through said loads.

8. Apparatus for storing representations of input data in a movable storage medium having a predetermined number of storage positions, comprising an input data storage unit corresponding to each of said predetermined number of storage positions, said units respectively including corresponding pluralities of storage locations, a like plurality of self-sustaining electronic switches each including an input terminal for receiving data from a storage location, each of said switches further including a pair of output terminals, a like plurality of transfer means each connected in a first circuit to the output terminals of a corresponding one of said switches and adapted to a data representation in a discrete area of said medium at each of said storage positions, a like plurality of resistive means each coupled in a second circuit to the output terminals of corresponding ones of said switches and adapted, when energized, to sustain current flow in the latter, means operative for each storage position of said medium at said transfer means for simultaneously energizing each of said second circuits throughout a predetermined time interval, means operative during a first portion of said time interval for sequentially reading out the data contents of said storage locations simultaneously for all of said units, means responsive to the storage position of said medium at said transfer means for selecting the data contents of the storage unit corresponding thereto, means for coupling said selected data contents to the input terminals of corresponding ones of said switches to fire the latter, and means operative during a subsequent portion of said time interval for simultaneously energizing each of said first circuits to effect the transfer of said data representations to the particular storage position of said medium at said transfer means.

9. Apparatus for storing data representations at a predetermined number of storage positions in a document, comprising a transfer station including a plurality of transfer means each adapted to provide a data representation in a discrete area of a storage position on said document, transport means for successively moving said document storage positions opposite said transfer station, memory means including a storage unit corresponding to each of said storage positions, each of said storage units comprising a like plurality of corresponding storage locations, a self-sustaining electronic switch corresponding to each of said transfer means and including a pair of output terminals coupled in a first series circuit with the latter, each of said switches further including an input terminal, a resistive impedance means corresponding to each of said switches coupled in a second series circuit with said output terminal pair, means controlled by said transport for deriving a signal in response to the presence of each document storage position opposite said transfer station, means responsive to each of said signals for simultaneously energizing all of said second circuits for a predetermined time interval, means for sequentially reading out the input data contents of said plurality of storage locations simultaneously for all of said storage units during a first portion of said time interval, means responsive to said signals for selecting the contents of the storage unit corresponding to the prevailing document storage position, means for applying said selected, sequentially readout data contents to the input terminals of the corresponding switches to initiate current flow between the output terminals thereof, and means responsive to each of said signals for simultaneously energizing all of said first circuits to effect the transfer of said data representations at said prevailing document storage position.

10. Apparatus for storing data representations at a predetermined number of storage positions in a document, comprising a transfer station including a plurality of transfer means adapted to provide data representations in discrete areas of each storage position, an actuator corresponding to each of said transfer means, a transport for successively moving said document storage positions opposite said transfer station, cam means activated by said transport, first switch means controlled by said cam means for providing position pulses at regular time intervals initiated by the arrival of each document and corresponding to the appearance of storage positions at said transfer station thereafter, delay means responsive to the first position pulse in each time interval to provide a compare pulse, means including a like number of output lines for providing a count of said position pulses thereon, a memory for storing input data comprising a like number of storage planes each including a like plurality of storage locations, memory address and control means adapted, upon initiation by said compare pulse, to sequentially read out the contents of corresponding ones of said plurality of storage locations simultaneously from all of said storage planes, gating means responsive to the signal on said predetermined number of output lines to select the output of one of said storage planes for each document storage position, an electronic switch corresponding to each of said transfer means of the kind adapted, upon the application of a signal to an input terminal thereof, to sustain current flow between a pair of output terminals as long as a sustaining voltage exists therebetween, means for coupling one output terminal of each of said pairs to a reference potential, means for coupling the other output terminal in a first series circuit to the corresponding actuator, a separate current-sustaining resistor corresponding to each of said switches and coupled in a second series circuit to each of said other output terminals, means responsive to each of said compare pulses for simultaneously energizing each of said second circuits, means responsive to said memory address and control means for applying said sequentially read out contents of said plurality of storage locations to the input terminals of the corresponding electronic switches to fire the latter, second switch means responsive to said cam for simultaneously energizing each of said first circuits during a predetermined period following the readout of said memory, and means responsive to each said position pulses for simultaneously terminating the energization of each of said first and second circuits.

11. Data processing apparatus comprising a document punch station having a plurality of aligned punches each including a solenoid actuator, a document transport adapted to present a predetermined number of successive document rows at regular time intervals to said station for punching, cam means linked to said transport, a first circuit corresponding to each of said punches and including switch means and a D.C. source connected to each of said solenoid actuators, said switch means being adapted to be activated by said cam means for a predetermined time period during each of said time intervals, means actuated by said cam for generating a row pulse upon the arrival of each document and immediately following each of said periods, means for delaying said row pulses to provide corresponding compare pulses, means including an output line corresponding to each of said document rows for providing a count of said row pulses thereon, a memory for storing input data including a number of substantially identical storage planes each corresponding to one of said document rows, each of said planes including a storage location corresponding to one of said punches, memory address and control means responsive to each of said compare pulses to initiate the sequential addressing of corresponding storage locations simultaneously for all of said storage locations, gating means responsive to the row pulse count on said output lines to select a corresponding storage plane for readout, a silicon-controlled rectifier corresponding to each of said punches each having a gate, an anode and a cathode, means responsive to said memory address and control means for applying the output signals from said sequentially addressed storage locations to the gates of the corresponding rectifiers, means for coupling each of said anodes to a reference potential, means for coupling each of said cathodes to the corresponding first circuit, a second circuit corresponding to each of said punches including a separate sustaining resistor having one terminal connected to the corresponding cathode, and means connected to the other terminal of said resistor and for applying a D.C. potential to each of said second circuits during the interval between the occurrence of each compare pulse and the occurrence of the subsequent row pulse.

No references cited.

ROBERT C. BAILEY, *Primary Examiner.*

O. E. TODD, *Assistant Examiner.*

UNITED STATES PATENT OFFICE

CERTIFICATE OF CORRECTION atent No. 3,305,844 February 21, 1967

Kamla P. Yadav et al.

It is certified that error appears in the above identified patent and that said Letters Patent are hereby corrected as shown below:

Column 7, line 3, "member" should read -- memory --.

Signed and sealed this 28th day of April 1970.

SEAL)

ttest:

dward M. Fletcher, Jr.
ttesting Officer

WILLIAM E. SCHUYLER, JR.
Commissioner of Patents